(12) United States Patent
Crawford et al.

(10) Patent No.: US 9,542,459 B2
(45) Date of Patent: Jan. 10, 2017

(54) ADAPTIVE DATA COLLECTION

(71) Applicant: International Business Machines Corporation, Armonk, NY (US)

(72) Inventors: Glenn P. Crawford, Cary, NC (US); James C. Fletcher, Apex, NC (US); Rocky D. McMahan, Pittsboro, NC (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 13/897,881

(22) Filed: May 20, 2013

(65) Prior Publication Data
US 2014/0344442 A1    Nov. 20, 2014

(51) Int. Cl.
| | |
|---|---|
| H04L 12/26 | (2006.01) |
| G06F 17/30 | (2006.01) |
| G06F 11/34 | (2006.01) |
| G06F 11/30 | (2006.01) |
| G06Q 30/02 | (2012.01) |

(52) U.S. Cl.
CPC ..... *G06F 17/30557* (2013.01); *G06F 11/3006* (2013.01); *G06F 11/3419* (2013.01); *H04L 12/2602* (2013.01); *H04L 43/04* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 6,574,587 B2 | 6/2003 | Waclawski | |
| 7,089,301 B1 * | 8/2006 | Labio | G06F 17/30206 |
| | | | 707/E17.032 |

(Continued)

FOREIGN PATENT DOCUMENTS

JP    2007-128122 A    5/2007

OTHER PUBLICATIONS

Islam, Sadeka, et al. "Empirical prediction models for adaptive resource provisioning in the cloud." Future Generation Computer Systems 28.1 (2012): 155-162.*

(Continued)

*Primary Examiner* — Ranodhi Serrao
*Assistant Examiner* — James Fiorillo
(74) *Attorney, Agent, or Firm* — Stephen R. Tkacs; Stephen J. Walder, Jr.; Joseph Petrokaitis

(57) ABSTRACT

A mechanism is provided for adaptive data collection. A set of data collection mechanisms operating within an information technology system is discovered. For each resource specific piece of data being collected by the set of data collection mechanisms, a determination is made as to whether more than one data collection mechanism is collecting the resource specific piece of data from a resource. Responsive to more than one data collection mechanism collecting the resource specific piece of data from the resource, a time interval to collect the resource specific piece of data from the resource is set to a smallest collection interval of the collection intervals utilized by the more than one data collection mechanism. Collection of the resource specific piece of data from the resource by the more than one data collection mechanism is suspended and the resource specific piece of data is collected without utilizing the more than one data collection mechanism.

17 Claims, 6 Drawing Sheets

(56) References Cited

U.S. PATENT DOCUMENTS

| | | | |
|---|---|---|---|
| 7,130,812 B1* | 10/2006 | Iyer | G06F 17/3051 705/28 |
| 7,188,170 B1* | 3/2007 | Burnley | G06F 11/3419 702/186 |
| 7,246,159 B2 | 7/2007 | Aggarwal et al. | |
| 7,444,263 B2 | 10/2008 | White et al. | |
| 7,647,527 B2 | 1/2010 | Duan et al. | |
| 7,752,301 B1* | 7/2010 | Maiocco | G06F 15/173 709/224 |
| 7,761,556 B2 | 7/2010 | Mills | |
| 7,899,906 B2 | 3/2011 | Black et al. | |
| 8,086,721 B2* | 12/2011 | See | H04L 12/2602 709/224 |
| 8,239,526 B2 | 8/2012 | Simpson et al. | |
| 9,037,698 B1* | 5/2015 | Nordstrom | G06F 11/301 707/736 |
| 2005/0033561 A1* | 2/2005 | Orofino, II | G06F 17/5009 703/1 |
| 2006/0085536 A1 | 4/2006 | Meyer et al. | |
| 2006/0116981 A1 | 6/2006 | Krimmel et al. | |
| 2006/0168194 A1 | 7/2006 | Lake et al. | |
| 2007/0005755 A1* | 1/2007 | Humphries | G06F 11/3006 709/224 |
| 2007/0061450 A1* | 3/2007 | Burnley | G06F 11/3419 709/224 |
| 2008/0077687 A1* | 3/2008 | Marvasti | H04L 41/0631 709/224 |
| 2009/0276488 A1* | 11/2009 | Alstad | H04L 67/303 709/203 |
| 2012/0226796 A1* | 9/2012 | Morgan | H04L 12/1453 709/224 |
| 2012/0226804 A1 | 9/2012 | Raja et al. | |
| 2012/0259588 A1 | 10/2012 | Nakazawa et al. | |
| 2013/0019009 A1* | 1/2013 | Tremblay | G06Q 30/02 709/224 |
| 2013/0173539 A1* | 7/2013 | Gilder | G06F 17/30578 707/622 |
| 2014/0280388 A1* | 9/2014 | Fox | G06F 17/30091 707/812 |
| 2014/0304408 A1* | 10/2014 | Rhee | H04L 1/0019 709/224 |
| 2015/0067019 A1* | 3/2015 | Balko | G06F 9/5038 709/202 |
| 2015/0134733 A1* | 5/2015 | Maturana | H04L 43/04 709/203 |

OTHER PUBLICATIONS

Ganek, A.G. and Corbi, T.A., 2003. The dawning of the autonomic computing era. IBM systems Journal, 42(1), pp. 5-18.*

* cited by examiner

ADAPTIVE DATA COLLECTION

BACKGROUND

The present application relates generally to an improved data processing apparatus and method and more specifically to mechanisms for adaptive data collection.

Within an information technology (IT) environment, one time consuming and costly operation is to monitor the IT environment. For example, in a z/OS® environment, several monitoring products may be required to monitor all of the resources running in the environment. The more million instructions per second (MIPS) used as a result of running those monitoring products, the more time and cost is expended within the IT environment. Although the focus of each monitoring product may be different (Customer Information Control System (CICS®), Information Management System (IMS™), z/OS®, etc.) there are many pieces of data that are used by multiple monitoring products. That is, each monitoring product collects its own data, resulting in duplication in data collection when multiple monitoring products are installed in the same environment. Some data is collected on a set time interval, but may not be needed as frequently as the data is collected. Furthermore, some data may have higher demand to certain periods of the day and lower or no demand during other periods.

SUMMARY

In one illustrative embodiment, a method, in a data processing system, is provided for adaptive data collection. The illustrative embodiment discovers a set of data collection mechanisms operating within an information technology system. For each resource specific piece of data being collected by the set of data collection mechanisms, the illustrative embodiment determines whether more than one data collection mechanism of the set of data collection mechanisms is collecting the resource specific piece of data from a resource. Responsive to more than one data collection mechanism of the set of data collection mechanisms collecting the resource specific piece of data from the resource, the illustrative embodiment sets a time interval to collect the resource specific piece of data from the resource to a smallest collection interval of the collection intervals utilized by the more than one data collection mechanism. The illustrative embodiment suspends collection of the resource specific piece of data from the resource by the more than one data collection mechanism. Then the illustrative embodiment collects the resource specific piece of data without utilizing the more than one data collection mechanism.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide an adaptive data collection mechanism that provides for a collection of data required by multiple monitoring products, consolidating data collection to a single data collection point, and varying a frequency of data collection based on demand for the data being collected, thereby reducing the million instructions per second (MIPS) utilized by the multiple monitoring products and the time and cost associated with monitoring an information technology (IT) environment.

Figure 1:
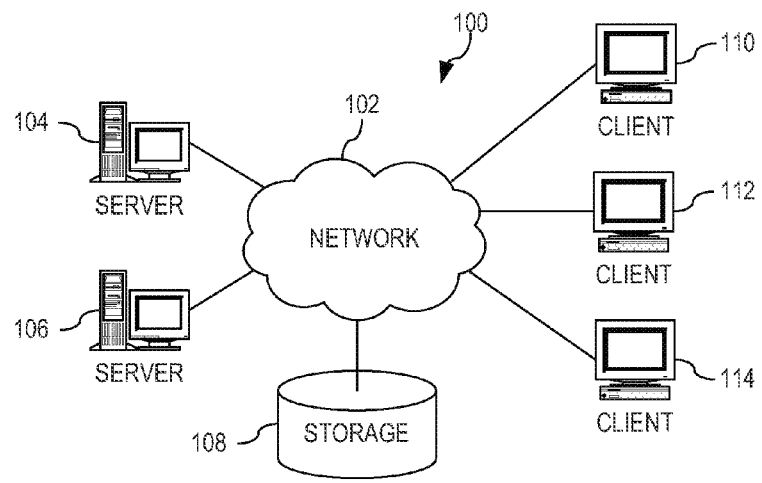
FIG. 1 is an example diagram of a distributed data processing system in which aspects of the illustrative embodiments may be implemented.
Figure 2:
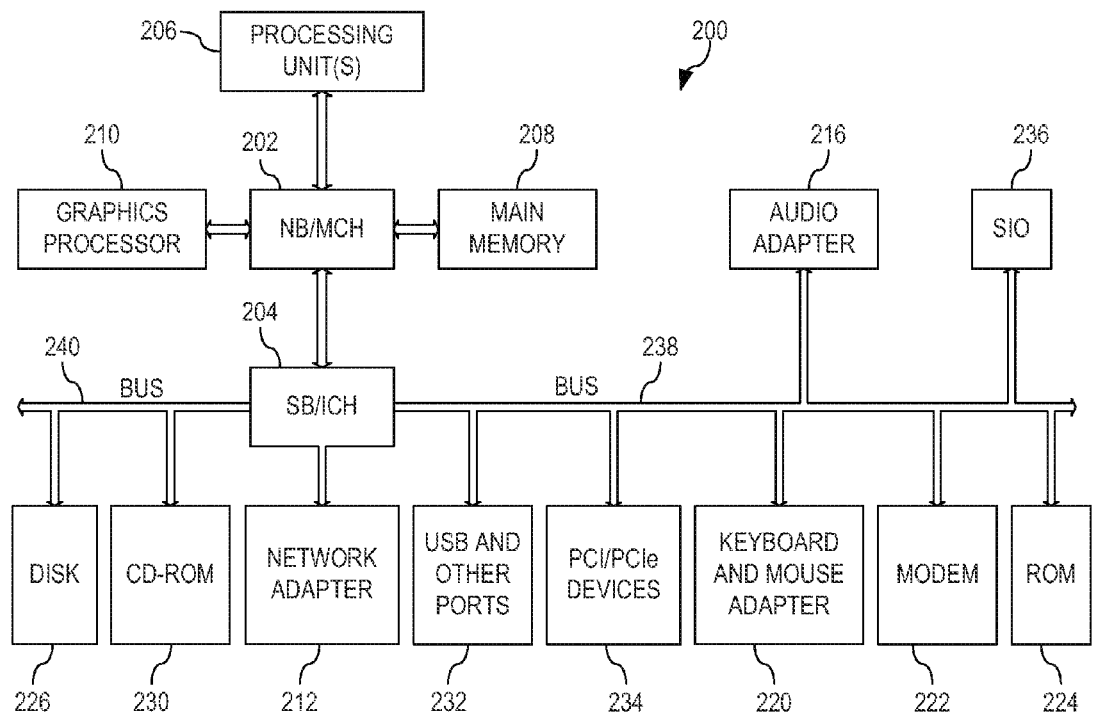
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Again, running an information technology (IT) environment is both time consuming and costly in at least with regard to monitoring of the IT equipment, such as server 104 and 106 and clients 110, 112, and 114 of FIG. 1, and/or data processing system 200. Thus, the illustrative embodiments provide for an adaptive data collection mechanism for the multiple monitoring products within the IT environment that optimizes data collection by eliminating duplicate data collection, intelligently collects the data by only collecting data required for the monitoring products installed within the IT environment, and adaptively collects data by varying data collection frequency based on demand, all the while reducing processor usage across the IT environment.

Figure 3:
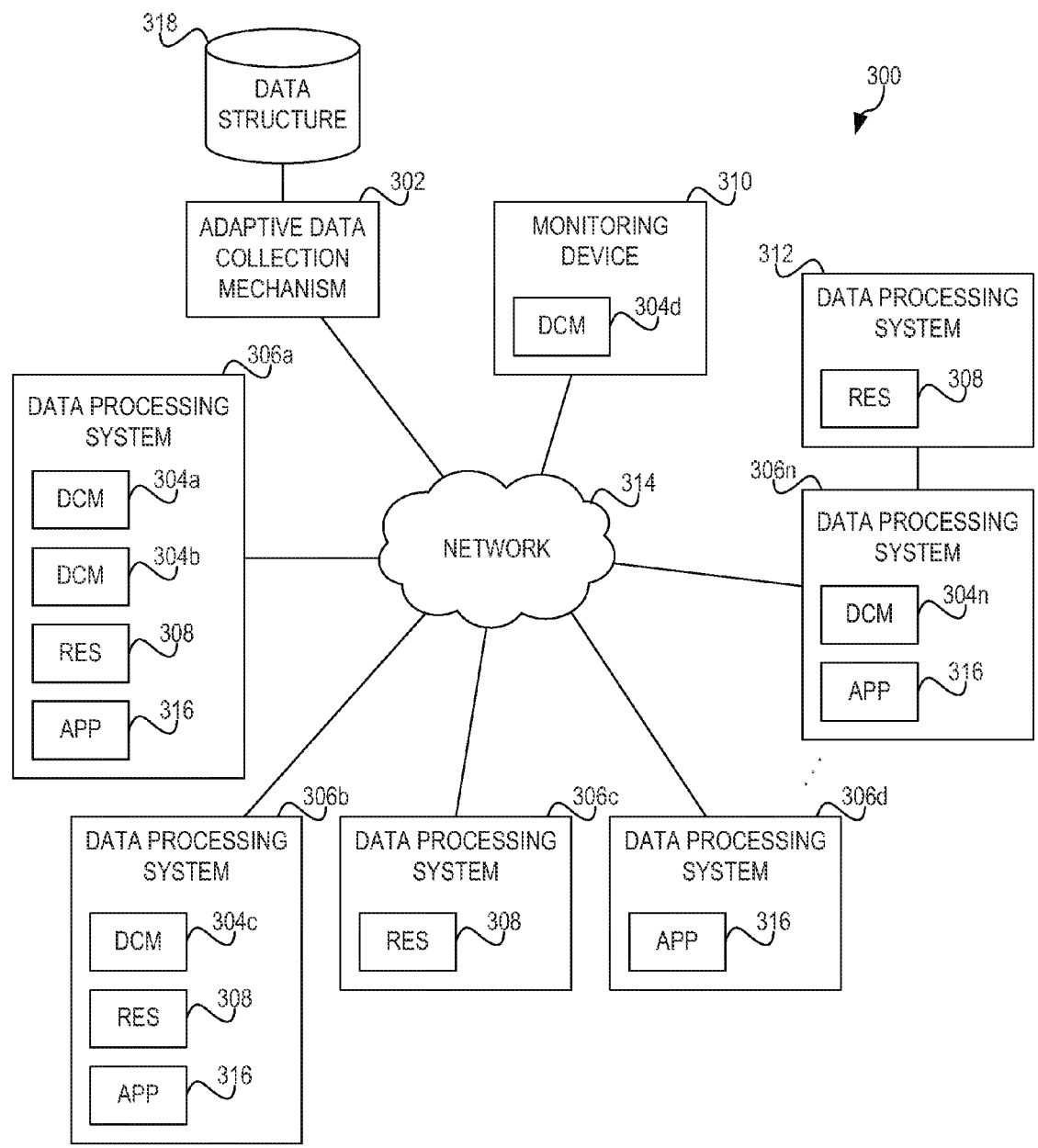
FIG. 3 depicts a functional block diagram for an adaptive data collection mechanism in accordance with an illustrative embodiment.

FIG. 3 depicts a functional block diagram for an adaptive data collection mechanism in accordance with an illustrative embodiments. As is illustrated, information technology environment 300 comprises adaptive data collection mechanism 302 coupled to a plurality of data collection mechanisms 304a-304n. It should be noted that each data collecting mechanism may be part of an application and the application may be a monitoring application. Each of data collection mechanisms 304a-304n monitors one or more resources 308 within data processing systems 306a-306n. Thus, data collection mechanisms 304a-304n may be located within the data processing system where the resource being monitored is located, as is illustrated by data collection mechanisms 304a and 304b, which are located within data processing system 306a, and data collection mechanism 304c, which is located within data processing system 306b. Alternatively, data collection mechanisms 304a-304n may be located remotely from the resource being monitored, as is illustrated by data collection mechanisms 304d within monitoring device 310 monitoring a resource located within any of data processing systems 306a-306n. As a further alternative, data collection mechanisms 304a-304n may be located within one data processing system but monitoring a resource within another data processing system, as is illustrated by data collection mechanisms 304n located within data processing system 306n monitoring a resource located within data processing system 312 that is coupled to data processing system 306n. Additionally, although adaptive data collection mechanism 302 is illustrated as a stand-alone mechanism, the illustrative embodiments recognize that adaptive data collection mechanism 302 may be implemented within any of data collection mechanisms 304a-304n so long as adaptive data collection mechanism 302 is coupled to each of the remaining data collection mechanisms 304a-304n either directly or through network 314.

Regardless of where adaptive data collection mechanism 302 operates within information technology environment 300, adaptive data collection mechanism 302 discovers all of data collection mechanisms 304a-304n operating within information technology environment 300. Once adaptive data collection mechanism 302 discovers all of data collection mechanisms 304a-304n, adaptive data collection mechanism 302 requests information from data collection mechanisms 304a-304n as to the resource specific pieces of data that are being collected and a time interval or frequency with which the data is being collected. With the collected information, adaptive data collection mechanism 302 determines whether a resource specific piece of data is being collected by more than one of data collection mechanisms 304a-304n. For each resource specific piece of data that is being collected by the more than one of data collection mechanisms 304a-304n, adaptive data collection mechanism 302 determines the time intervals at which the data is being collected by each of the more than one data collection mechanisms 304a-304n. That is, for example, one data collection mechanism may be collecting the resource specific piece of data every 5 minutes where another data collection mechanism is collecting the resource specific piece of data every 2 minutes. Adaptive data collection mechanism 302 identifies the smallest of the time intervals from the more than one data collection mechanisms 304a-304n. Adaptive data collection mechanism 302 then sets the time interval for collecting the resource specific piece of data to the smallest time interval. Once adaptive data collection mechanism 302 identifies all of the resource being monitored by data collection mechanisms 304a-304n and selects a smallest time interval for collecting each resource specific piece of data, adaptive data collection mechanism 302 suspends the collection of the resource specific piece of data from the resource by each of data collection mechanisms 304a-304n.

For the remaining resource specific pieces of data that are not being collected by more than one of data collection mechanisms 304a-304n, adaptive data collection mechanism 302 sets the time interval for collecting each individual resource specific piece of data to the time interval at which the resource specific piece of data was already being collected. At those respective collection intervals, adaptive data collection mechanism 302 collects the resource specific pieces of data and stores the collected resource specific pieces of data in data structure 318.

Thus, in accordance with the illustrative embodiments, rather than data collection mechanisms 304a-304n collecting the resource specific pieces of data, adaptive data collection mechanism 302 collects all of the resource specific pieces of data based on the respective selected time interval for each resource specific piece of data. Adaptive data collection mechanism 302 stores the collected resource specific piece of data in data structure 318. Therefore, since adaptive data collection mechanism 302 has collected the various resource specific pieces of data that would otherwise be collected by data collection mechanisms 304a-304n, data collection mechanisms 304a-304n obtain their respective collected resource specific piece of data directly from adaptive data collection mechanism 302 and data structure 318. Thus, when one or more of applications 316 that needs the collected resource specific piece of data, application 316 requests the resources specific piece of data from of its associated data collection mechanisms 304a-304n, the associated data collection mechanisms 304a-304n retrieves their requested resources specific piece of data directly from adaptive data collection mechanism 302, and the associated data collection mechanisms 304a-304n returns the requested resources specific piece of data to application 316.

As exemplified previously, one data collection mechanism may be collecting the resource specific piece of data every 5 minutes where another data collection mechanism is collecting the resource specific piece of data every 2 minutes. However, the 2 minute collection interval may only be during a daytime period and, during a nighttime period, that data collection mechanism may not normally collect the resource specific piece of data. Thus, adaptive data collection mechanism 302 adaptively changes the time interval at which the resource specific piece of data is collected by determining, for each resource specific piece of data, whether the collected resource specific piece of data has been requested by one or more of applications 316 during a last time interval. If adaptive data collection mechanism 302 determines that the collected resource specific piece of data has not been requested by one or more applications 316 during the last time interval, then adaptive data collection mechanism 302 recognizes that the current time interval for collecting the resource specific piece of data is too small and increases the current time interval for collecting the resource specific piece of data by a predetermined time value.

Thus, rather than adaptive data collection mechanism 302 collecting the resource specific piece of data every 2 minutes, adaptive data collection mechanism 302 may now be collecting the resource specific piece of data every 4 minutes. Adaptive data collection mechanism 302 may continue to adaptively change the time interval at which the resource specific piece of data is collected until a request is detected in the last time interval. Alternatively, adaptive data collection mechanism 302 may increase the current time interval by the predetermined amount until a predefined maximum time interval is reached. Therefore, adaptive data collection mechanism 302 will continue to collect the resource specific piece of data at the maximum time interval even though the collected resource specific piece of data may not be requested by even one of applications 316.

While the previous adaptation covers instances where the time interval is too small and needs to be increased, there may also be instances where the current time interval is too large. For instance, in continuing with the previous example, where a data collection mechanism has gone into a nighttime period and the data collection interval has increased, when the data collection mechanism again enters a daytime period, then one or more applications 316 may request the data. Thus, adaptive data collection mechanism 302 adaptively changes the time interval at which the resource specific piece of data is collected, by also determining, for each resource specific piece of data, whether the collected resource specific piece of data is too old to satisfy the request, thus needing to be collected again by adaptive data collection mechanism 302, in order to satisfy the data request. If adaptive data collection mechanism 302 determines that the collected resource specific piece of data is too old to satisfy the request, then adaptive data collection mechanism 302 recognizes that the current time interval for collecting the resource specific piece of data is too large. Accordingly, adaptive data collection mechanism 302 decreases the current time interval for collecting the resource specific piece of data by a predetermined time value. Thus, rather than collecting the resource specific piece of data every 2 minutes, adaptive data collection mechanism 302 may now be collecting the resource specific piece of data every 30 seconds.

In an alternative embodiment, rather than automatically decreasing the current time interval, adaptive data collection mechanism 302 may make a determination as to whether a decrease time interval threshold has been met. That is, adaptive data collection mechanism 302 may first determine whether the number of requests during a predetermined time interval, for which the data requested has been too old, have exceeded the decrease time interval threshold. If adaptive data collection mechanism 302 determines that the number of requests during the predetermined time interval, for which the data requested has been too old, does not exceed the decrease time interval threshold, then adaptive data collection mechanism 302 may leave the current time interval as is. However, if adaptive data collection mechanism 302 determines that the number of requests during the predetermined time interval, for which the data requested has been too old, exceeds the decrease time interval threshold, then adaptive data collection mechanism 302 may decrease the current time interval by a predetermined amount.

As another alternative embodiment, adaptive data collection mechanism 302 may decrease the current time interval by the predetermined amount until a predefined minimum time interval is reached. Therefore, even though the data that is requested by one or more of applications 316 is too old to satisfy one or more requests and the decrease time interval threshold has been met, adaptive data collection mechanism 302 will continue to collect the resource specific piece of data at the minimum time interval even though the same collected resource specific piece of data is returned to one of applications 316 more than once.

It should be noted that the above processes of increasing and decreasing collection intervals may be performed whenever one of data collection mechanisms 304a-304n comes online or goes offline. That is, each time one of data collection mechanisms 304a-304n comes online or goes offline, adaptive data collection mechanism 302 needs to recalculate the lowest collection interval. This collection interval may increase as one or more of data collection mechanisms 304a-304n go offline, and decrease as one or more of data collection mechanisms 304a-304n come online.

In addition to changing the time interval at which the resource specific piece of data is collected based on the number of requests received during the last time interval, rather than increasing and decreasing the current time interval by a predetermined amount in increments, adaptive data collection mechanism 302 may also use historical data to increase or decrease the current time interval at a faster rate. That is, by increasing or decreasing the current time interval by a predetermined time value every processor cycle, there may be instances where adaptive data collection mechanism 302 does not adjust the collecting time interval fast enough and many requests may be responded to with data that is not current. In order to account for such instances, for each particular resource specific piece of data, adaptive data collection mechanism 302 utilizes historical data that indicates a time interval used for a particular time period. If the historical data indicates that a time interval of 30 seconds is used for a current time interval and the currently implemented time interval is 20 minutes, then adaptive data collection mechanism 302 adaptively implements the 30 second time interval in one processor cycle. Utilizing historical information is an alternative to, for example, increasing the time interval from 20 minutes to 30 seconds at 30 second time steps, which would take 39 processor cycles.

Thus, adaptive data collection mechanism 302 eliminates duplicate data collection by optimizing the data collection performed by the plurality of data collection mechanisms within an IT environment. Adaptive data collection mechanism 302 optimizes the data collection by only collecting the resource specific piece of data once during a current time interval, varying the collection interval for each particular resource specific piece of data based on demand, thereby reducing processor usage across the IT environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart, and/or block diagram block or blocks.

Figure 4:
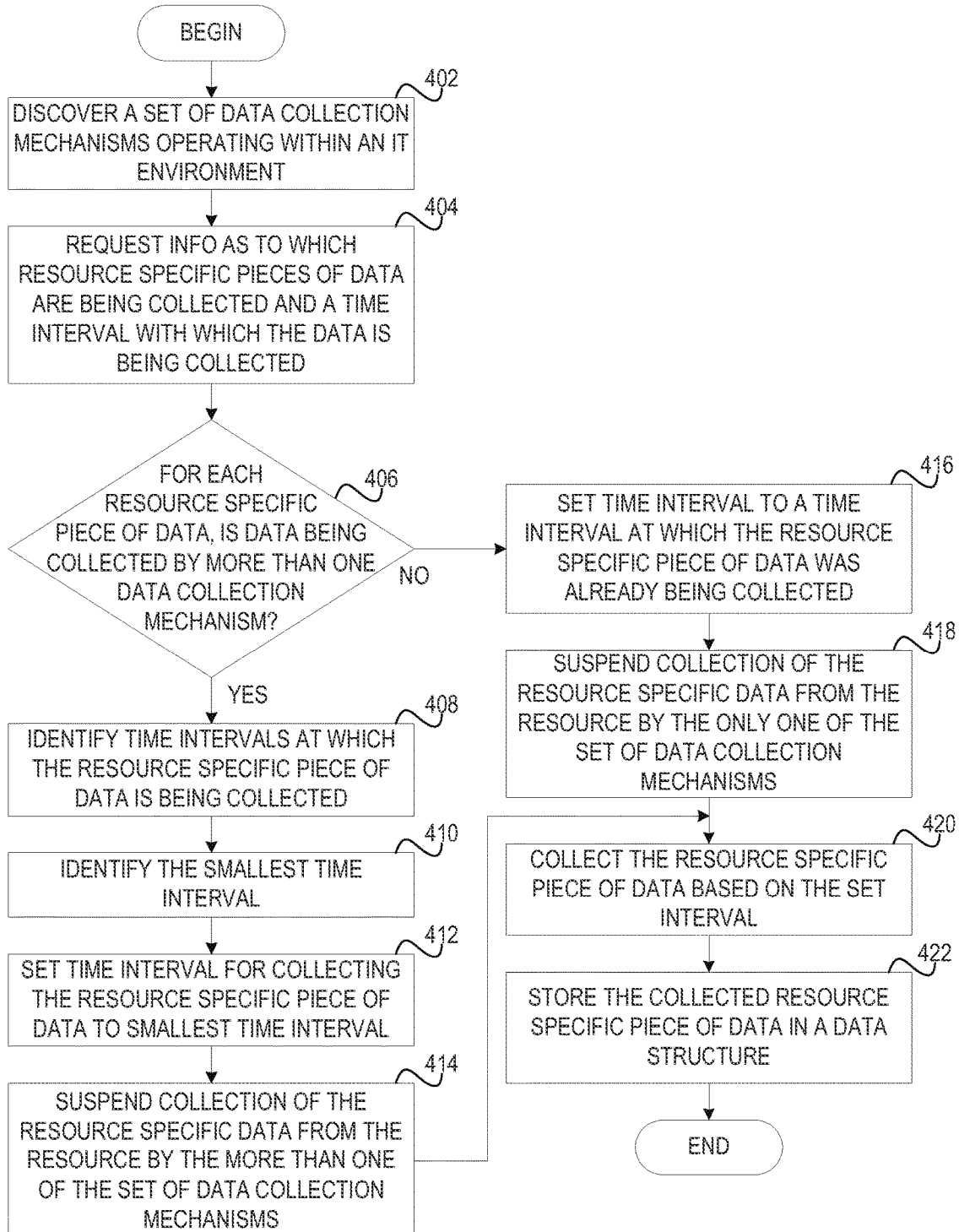
FIG. 4 depicts a flowchart of the operation performed by an adaptive data collection mechanism in establishing an efficient data collection process in accordance with an illustrative embodiment.

FIG. 4 depicts a flowchart of the operation performed by an adaptive data collection mechanism in establishing an efficient data collection process in accordance with an illustrative embodiment. As the operation begins, the adaptive data collection mechanism discovers a set of data collection mechanisms operating within an information technology environment (step 402). The adaptive data collection mechanism then requests information from each of the set of data collection mechanisms as to which resource specific pieces of data are being collected and a time interval or frequency with which the data is being collected (step 404). With the collected information, for each resource specific piece of data, the adaptive data collection mechanism determines whether the resource specific piece of data is being collected by more than one of the set of data collection mechanisms (step 406).

If at step 406 a resource specific piece of data is being collected by more than one of the set of data collection mechanisms, then, for each resource specific piece of data that is being collected by the more than one of the set of data collection mechanisms, the adaptive data collection mechanism identifies the time intervals at which the resource specific piece of data is being collected by each of the more than one data collection mechanisms (step 408). With the time intervals identified, the adaptive data collection mechanism identifies the smallest time interval of the time intervals from the more than one data collection mechanisms (step 410). The adaptive data collection mechanism then sets the time interval for collecting the resource specific piece of data to the smallest time interval (step 412) and suspends collection of the resource specific data from the resource by the more than one of the set of data collection mechanisms (step 414).

If at step 406 a resource specific piece of data fails to be collected by more than one of the set of data collection mechanisms, then, for each resource specific piece of data that is being collected by only one of the set of data collection mechanisms, the adaptive data collection mechanism sets the time interval for collecting the resource specific piece of data to a time interval at which the resource specific piece of data was already being collected (step 416) and suspends collection of the resource specific data from the resource by the only one of the set of data collection mechanisms(step 418). From steps 414 and 418, the adaptive data collection mechanism collects the resource specific piece of data based on the set interval (step 420). The adaptive data collection mechanism stores the collected resource specific piece of data in a data structure (step 422), with the operation terminating thereafter.

Figure 5:
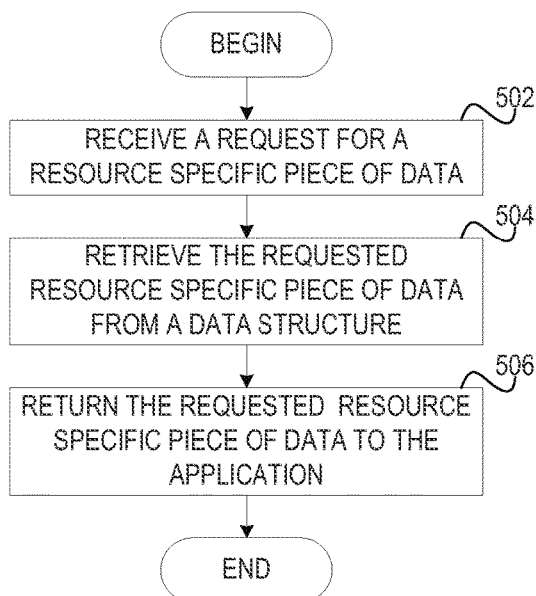
FIG. 5 depicts a flowchart of the operation performed by an adaptive data collection mechanism in providing resource specific pieces of data in accordance with an illustrative embodiment.

FIG. 5 depicts a flowchart of the operation performed by an adaptive data collection mechanism in providing resource specific pieces of data in accordance with an illustrative embodiment. As described previously, rather than data collection mechanisms collecting information from various resources, in accordance with the illustrative embodiments, data collection mechanisms now obtain the information directly from the adaptive data collection mechanism. Thus, as the operation begins, the adaptive data collection mechanism receives a request for a resource specific piece of data (step 502). The adaptive data collection mechanism retrieves the requested resource specific piece of data from a data structure (step 504) and returns the requested resource specific piece of data to the application (step 506), with the operation terminating thereafter.

Figure 6:
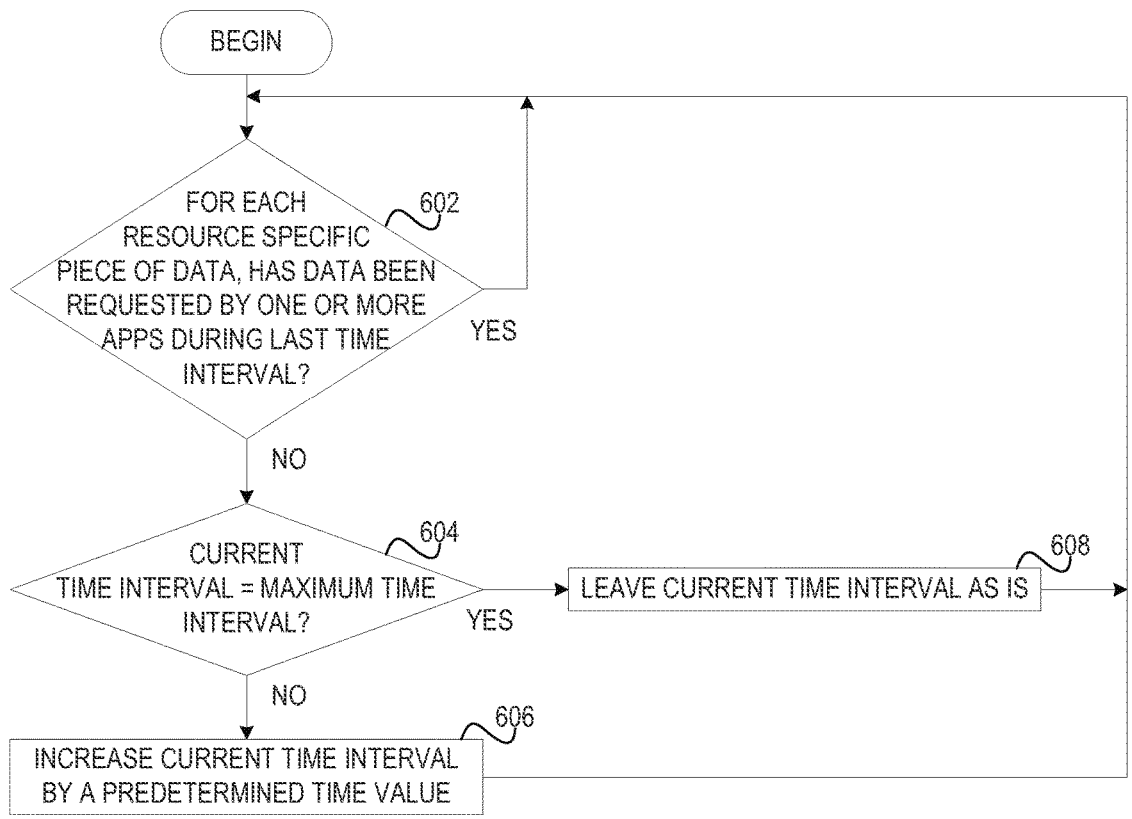
FIG. 6 depicts a flowchart of the operation performed by an adaptive data collection mechanism in adaptively increasing a current time interval at which a resource specific piece of data is collected in accordance with an illustrative embodiment.

FIG. 6 depicts a flowchart of the operation performed by an adaptive data collection mechanism in adaptively increasing a current time interval at which a resource specific piece of data is collected in accordance with an illustrative embodiment. As the operation begins, the adaptive data collection mechanism determines, for each resource specific piece of data, whether the collected resource specific piece of data has been requested by one or more applications during a last time interval (step 602). If at step 602 the adaptive data collection mechanism determines that the collected resource specific piece of data has been requested by one or applications during the last time interval, then the operation returns to step 602. If at step 602 the adaptive data collection mechanism determines that the collected resource specific piece of data has not been requested by one or applications during the last time interval, then the adaptive data collection mechanism recognizes that the current time interval for collecting the resource specific piece of data is too small and determines whether the current time interval is equal to a maximum time interval (step 604). If at step 604 the current time interval fails to be equal to the maximum time interval, the adaptive data collection mechanism increases the current time interval for collecting the resource specific piece of data by a predetermined time value (step 606), with the operation returning to step 602 thereafter. If at step 604 the current time interval is equal to the maximum time interval, then the adaptive data collection mechanism leaves the current time interval as is (step 608), with the operation returning to step 602 thereafter.

Figure 7:
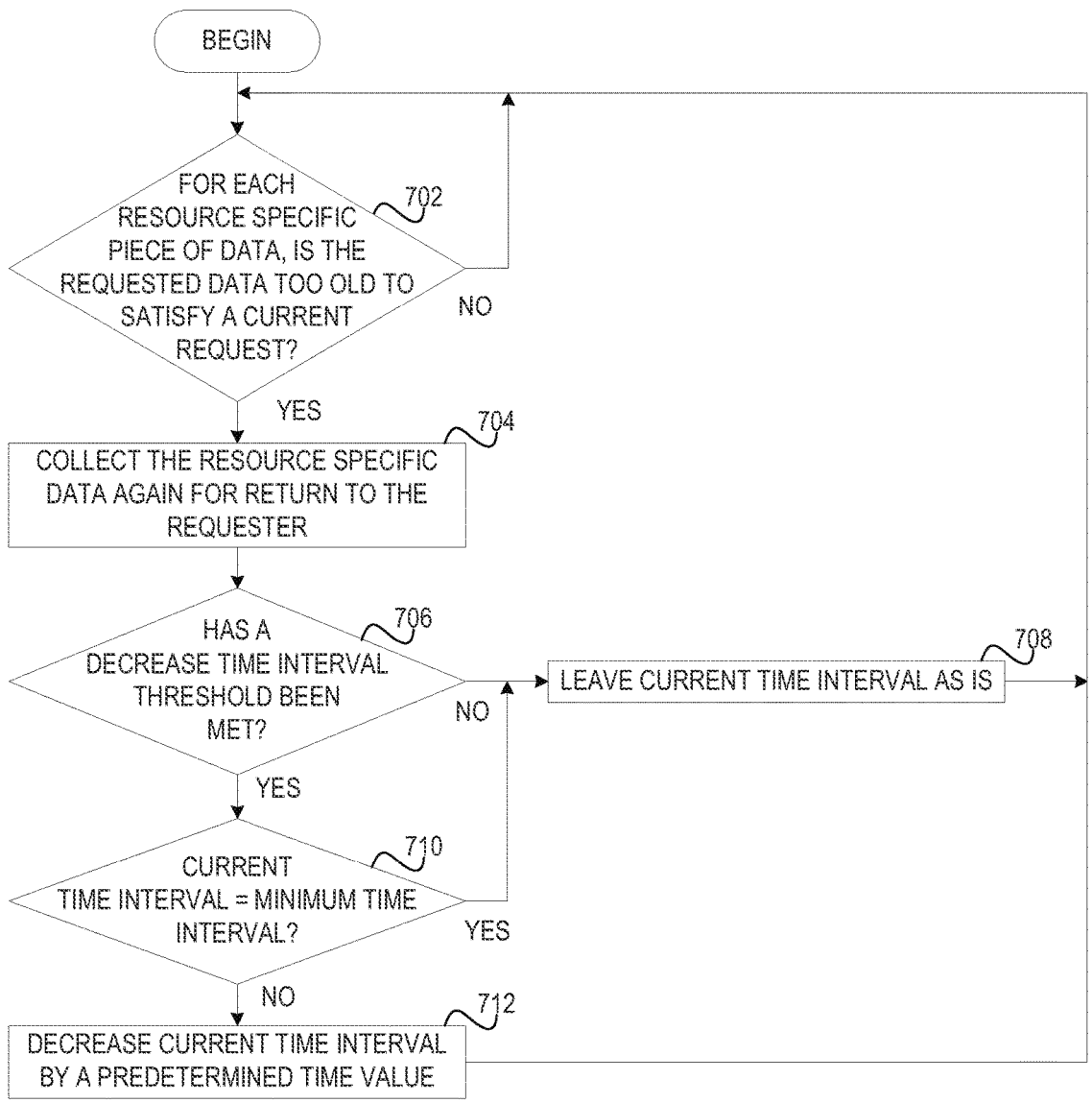
FIG. 7 depicts a flowchart of the operation performed by an adaptive data collection mechanism in adaptively decreasing a current time interval at which a resource specific piece of data is collected in accordance with an illustrative embodiment.

FIG. 7 depicts a flowchart of the operation performed by an adaptive data collection mechanism in adaptively decreasing a current time interval at which a resource specific piece of data is collected in accordance with an illustrative embodiment. As the operation begins, the adaptive data collection mechanism determines, for each resource specific piece of data, whether the collected resource specific piece of data that has been requested is too old to satisfy the request (step 702). If at step 702 the adaptive data collection mechanism determines that the collected resource specific piece of data is not too old, then the operation returns to step 702. If at step 702 the adaptive data collection mechanism determines that the collected resource specific piece of data is too old to satisfy the request, then the adaptive data collection mechanism collects the resource specific data again so that adaptive data collection mechanism may return current data to the requester (step 704).

Although the adaptive data collection mechanism may recognize that, by having to recollect the data, that the current time interval for collecting the resource specific piece of data is too large, rather than automatically decreasing the current time interval, the adaptive data collection mechanism makes a determination as to whether a decrease time interval threshold has been met (step 706). That is, the adaptive data collection mechanism determines whether the number of requests during a predetermined time interval, for which the data requested has been too old, have exceeded the decrease time interval threshold. If at step 706 the adaptive data collection mechanism determines that the number of requests during the predetermined time interval, for which the data requested has been too old, has not exceeded the decrease time interval threshold, the adaptive data collection mechanism leaves the current time interval as is (step 708), with the operation returning to step 702 thereafter.

However, if at step 706 the adaptive data collection mechanism determines that the number of requests during the predetermined time interval, for which the data requested has been too old, has exceeded the decrease time interval threshold, then the adaptive data collection data mechanism determines whether the current time interval is equal to a minimum time interval (step 710). If at step 710 the current time interval fails to be equal to the minimum time interval, the adaptive data collection mechanism decreases the current time interval for collecting the resource specific piece of data by a predetermined time value (step 712), with the operation returning to step 702 thereafter. If at step 710 the current time interval is equal to the minimum time interval, then the operation proceeds to step 708 where the adaptive data collection mechanism leaves the current time interval as is.

Figure 8:
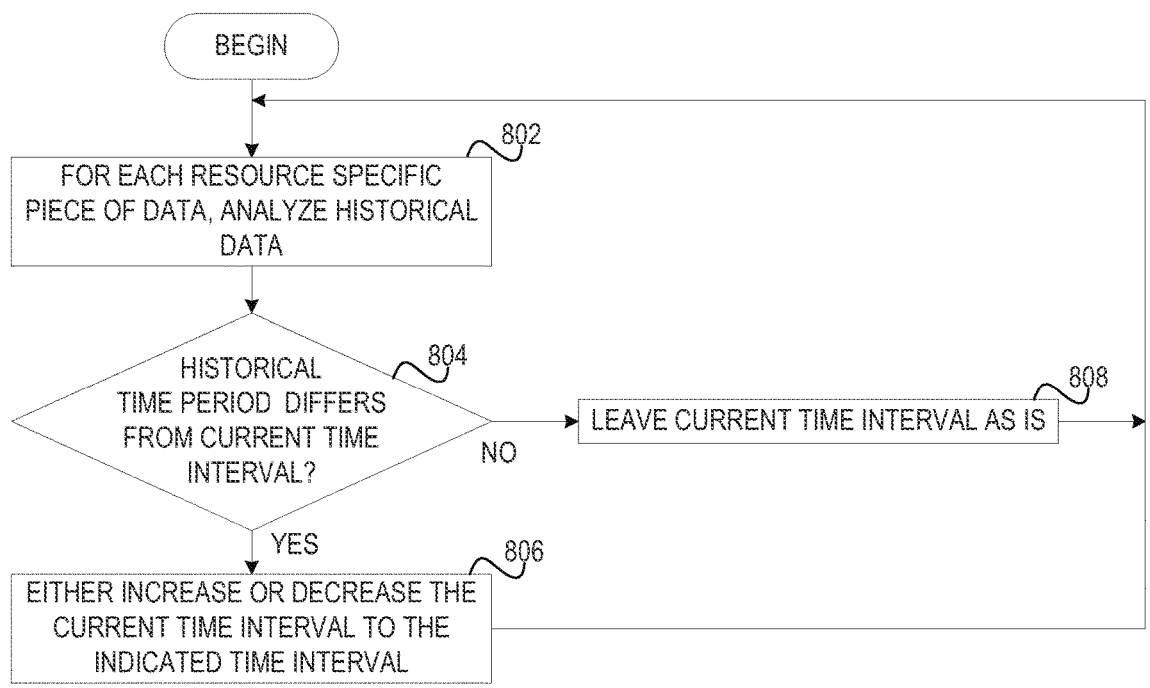
FIG. 8 depicts a flowchart of the operation performed by an adaptive data collection mechanism in adaptively increasing or decreasing a current time interval at which a resource specific piece of data is collected based on historical information in accordance with an illustrative embodiment.

FIG. 8 depicts a flowchart of the operation performed by an adaptive data collection mechanism in adaptively increasing or decreasing a current time interval at which a resource specific piece of data is collected based on historical information in accordance with an illustrative embodiment. As the operation begins, for each particular resource specific piece of data, the adaptive data collection mechanism analyzes historical data that indicates a time interval used for a particular time period (step 802). For a particular time period, the adaptive data collection mechanism determines whether the time interval indicated by the historical data differs from the current time interval (step 804). If at step 804 the time interval indicated by the historical data differs from the current time interval, then the adaptive data collection mechanism either increases or decreases the current time interval to the indicated time interval (step 806), with the operation returning to step 802 thereafter. If at step 804 the time interval indicated by the historical data fails to differ from the current time interval, then the adaptive data collection mechanism leaves the current time interval as is (step 808), with the operation returning to step 802 thereafter. In accordance with the illustrative embodiments, adjustments based on historical data are only performed once for the particular time period. However, other adjustments to a time interval during the particular time period may be made in accordance with the operation depicted in FIGS. 6 and 7.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for a collection of data required by multiple monitoring products by only one of the monitoring products, consolidating data collection to a single data collection point, and varying a frequency of data collection based on demand for the data being collected, thereby reducing the million instructions per second (MIPS) utilized by the multiple monitoring products and the time and cost associated with monitoring an information technology (IT) environment.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in an information technology system, for adaptive data collection, the method comprising:

discovering, by an adaptive data collection mechanism, a set of data collection mechanisms operating within the information technology system; and for each resource specific piece of data being collected by the set of data collection mechanisms from a single resource being monitored within the information technology system:

determining, by the adaptive data collection mechanism whether more than one data collection mechanism of the set of data collection mechanisms is collecting the resource specific piece of data from the single resource;

responsive to more than one data collection mechanism of the set of data collection mechanisms collecting the resource specific piece of data from the single resource;

setting, by the adaptive data collection mechanism, a time interval to collect the resource specific piece of data from the single resource to a smallest collection interval of the collection intervals utilized by the more than one data collection mechanism;

suspending, by the adaptive data collection mechanism, collection of the resource specific piece of data from the single resource by each of the more than one data collection mechanism; and collecting, by the adaptive data collection mechanism, the resource specific piece of data from the single resource without utilizing the more than one data collection mechanism;

determining, by the adaptive data collection mechanism, whether collected resource specific piece of data associated with the resource specific data for the single resource has been requested by one or more applications during a last time interval; and responsive to the collected resource specific piece of data failing to have been requested by one or more applications during the last time interval, increasing, by the adaptive data collection mechanism, a current time interval for collecting the resource specific piece of data by a pre-determined time value.

2. The method of claim 1, further comprising:

responsive to only one data collection mechanism of the set of data collection mechanisms collecting the resource specific piece of data from the single resource:

setting, by the adaptive data collection mechanism, a time interval to collect the resource specific piece of data from the single resource to the collection interval established by the only one data collection mechanism;

suspending, by the adaptive data collection mechanism, collection of the resource specific piece of data from the single resource by the only one data collection mechanism; and collecting, by the adaptive data collection mechanism, the resource specific piece of data from the single resource without utilizing the only one data collection mechanism.

3. The method of claim 1, further comprising:

storing, by the adaptive data collection mechanism, the collected resource specific piece of data for the single resource in a data structure.

4. The method of claim 1, further comprising:

receiving, by the adaptive data collection mechanism, a request for a collected resource specific piece of data for the single resource from an application;

retrieving, by the adaptive data collection mechanism, the collected resource specific piece of data from a data structure; and returning, by the adaptive data collection mechanism, the collected resource specific piece of data to the application.

5. The method of claim 1, further comprising:
for each resource specific piece of data;
determining, by the adaptive data collection mechanism, whether collected resource specific piece of data associated with the resource specific piece of data is too old to satisfy a current request;
responsive to the collected resource specific piece of data being too old to satisfy a current request, collecting, by the adaptive data collection mechanism, the resource specific piece of data from the single resource for return to satisfy the current request;
determining, by the adaptive data collection mechanism, whether a decrease time interval threshold has been met; and
responsive to the decrease time interval threshold being met, decreasing, by the adaptive data collection mechanism, the current time interval for collecting the resource specific piece of data by a predetermined time value.

6. The method of claim 1, further comprising:
for each resource specific piece of data:
analyzing, by the adaptive data collection mechanism, historical data indicating a time interval used for collecting the resource specific piece of data for a particular time period;
determining, by the adaptive data collection mechanism, whether the time interval indicated by the historical data differs from the current time interval;
responsive to the time interval indicated by the historical data differing from the current time interval, either increasing or decreasing, by the adaptive data collection mechanism, the current time interval to the time interval indicated by the historical data; and
responsive to the time interval indicated by the historical data failing to differ from the current time interval, leaving, by the adaptive data collection mechanism, the current time interval at a current setting.

7. A computer program product comprising a non-transitory computer readable storage medium having a computer readable program stored therein, wherein the computer readable program, when executed on an adaptive data collection device, causes the adaptive data collection device to:
discover, by the adaptive data collection device, a set of data collection mechanisms operating within a information technology system;
for each resource specific piece of data being collected by the set of data collection mechanisms from a single resource being monitored within the information technology system:
determine, by the adaptive data collection device, whether more than one data collection mechanism of the set of data collection mechanisms is collecting the resource specific piece of data from the single resource; and
responsive to more than one data collection mechanism of the set of data collection mechanisms collecting the resource specific piece of data from the single resource:
set, by the adaptive data collection device, a time interval to collect the resource specific piece of data from the single resource to a smallest collection interval of the collection intervals utilized by the more than one data collection mechanism;
suspend, by the adaptive data collection device, collection of the resource specific piece of data from the single resource by each of the more than one data collection mechanism; and
collect, by the adaptive data collection device, the resource specific piece of data from the single resource without utilizing the more than one data collection mechanism;
determine, by the adaptive data collection device, whether collected resource specific piece of data associated with the resource specific piece of data for the single resource has been requested by one or more applications during a last time interval; and
responsive to the collected resource specific data failing to have been requested by one or more applications during the last time interval, increase, by the adaptive data collection device, a current time interval for collecting the resource specific piece of data by a predetermined time value.

8. The computer program product of claim 7, wherein the computer readable program further causes the computing device to:
responsive to only one data collection mechanism of the set of data collection mechanisms collecting the resource specific piece of data from the single resource:
set, by the adaptive data collection device, a time interval to collect the resource specific piece of data from the resource to the collection interval established by the only one data collection mechanism;
suspend, by the adaptive data collection device, collection of the resource specific piece of data from the single resource by the only one data collection mechanism; and
collect, by the adaptive data collection device, the resource specific piece of data from the single resource without utilizing the only one data collection mechanism.

9. The computer program product of claim 7, wherein the computer readable program further causes the computing device to:
store, by the adaptive data collection device, the collected resource specific piece of data for the single resource in a data structure.

10. The computer program product of claim 7, wherein the computer readable program further causes the computing device to:
receive, by the adaptive data collection device, a request for a collected resource specific piece of data for the single resource from an application;
retrieve, by the adaptive data collection device, the collected resource specific piece of data from a data structure; and
return, by the adaptive data collection device, the collected resource specific piece of data to the application.

11. The computer program product of claim 7, wherein the computer readable program further causes the computing device to:
for each resource specific piece of data:
determine, by the adaptive data collection device, whether collected resource specific piece of data associated with the resource specific piece of data is too old to satisfy a current request;
responsive to the collected resource specific piece of data being too old to satisfy a current request, collect, by the adaptive data collection device, the resource specific piece of data from the single resource for return to satisfy the current request;

determine, by the adaptive data collection device, whether a decrease time interval threshold has been met; and responsive to the decrease time interval threshold being met, decrease, by the adaptive data collection device, the current time interval for collecting the resource specific piece of data by a predetermined time value.

12. The computer program product of claim 7, wherein the computer readable program further causes the computing device to:

for each resource specific piece of data:

analyze, by the adaptive data collection device, historical data indicating a time interval used for collecting the resource specific piece of data for a particular time period;

determine, by the adaptive data collection device, whether the time interval indicated by the historical data differs from the current time interval;

responsive to the time interval indicated by the historical data differing from the current time interval, either increase or decrease, by the adaptive data collection device, the current time interval to the time interval indicated by the historical data; and responsive to the time interval indicated by the historical data failing to differ from the current time interval, leave, by the adaptive data collection device, the current time interval at a current setting.

13. An adaptive data collection apparatus comprising:

a processor; and a memory, coupled to the processor, wherein the memory comprises instructions which, when executed by the processor, cause the processor to:

discover, by the adaptive data collection apparatus, a set of data collection mechanisms operating within a information technology system;

for each resource specific piece of data being collected by the set of data collection mechanisms from a single resource being monitored within the information technology system:

determine, by the adaptive data collection apparatus, whether more than one data collection mechanism of the set of data collection mechanisms is collecting the resource specific piece of data from the single resource; and responsive to more than one data collection mechanism of the set of data collection mechanisms collecting the resource specific piece of data from the single resource:

set, by the adaptive data collection apparatus, a time interval to collect the resource specific piece of data from the single resource to a smallest collection interval of the collection intervals utilized by the more than one data collection mechanism;

suspend, by the adaptive data collection apparatus, collection of the resource specific piece of data from the single resource by each of the more than one data collection mechanism; and collect, by the adaptive data collection apparatus, the resource specific piece of data from the single resource without utilizing the more than one data collection mechanism;

determine, by the adaptive data collection apparatus, whether collected resource piece of data associated with the resource specific piece of data for the single resource has been requested by one or more applications during a last time interval; and responsive to the collected resource specific piece of data failing to have been requested by one or more applications during the last time interval, increase by the adaptive data collection apparatus, a current time interval for collecting the resource specific piece of data by a predetermined time value.

14. The apparatus of claim 13, wherein the instructions further cause the processor to:

responsive to only one data collection mechanism of the set of data collection mechanisms collecting the resource specific piece of data from the single resource:

set, by the adaptive data collection apparatus, a time interval to collect the resource specific piece of data from the resource to the collection interval established by the only one data collection mechanism;

suspend, by the adaptive data collection apparatus, collection of the resource specific piece of data from the single resource by the only one data collection mechanism; and collect, by the adaptive data collection apparatus, the resource specific piece of data from the single resource without utilizing the only one data collection mechanism.

15. The apparatus of claim 13, wherein the instructions further cause the processor to:

receive, by the adaptive data collection apparatus, a request for a collected resource specific piece of data for the single resource from an application;

retrieve, by the adaptive data collection apparatus, the collected resource specific piece of data from a data structure; and return, by the adaptive data collection apparatus, the collected resource specific piece of data to the application.

16. The apparatus of claim 13, wherein the instructions further cause the processor to:

for each resource specific piece of data:

determine, by the adaptive data collection apparatus, whether collected resource specific piece of data associated with the resource specific piece of data is too old to satisfy a current request;

responsive to the collected resource specific piece of data being too old to satisfy a current request, collect, by the adaptive data collection apparatus, the resource specific piece of data from the single resource for return to satisfy the current request;

determine, by the adaptive data collection apparatus, whether a decrease time interval threshold has been met; and responsive to the decrease time interval threshold being met, decrease, by the adaptive data collection apparatus, the current time interval for collecting the resource specific piece of data by a predetermined time value.

17. The apparatus of claim 13, wherein the instructions further cause the processor to:

for each resource specific piece of data:

analyze, by the adaptive data collection apparatus, historical data indicating a time interval used for collecting the resource specific piece of data for a particular time period;

determine, by the adaptive data collection apparatus, whether the time interval indicated by the historical data differs from the current time interval;

responsive to the time interval indicated by the historical data differing from the current time interval, either increase or decrease, by the adaptive data collection apparatus, the current time interval to the time interval indicated by the historical data; and responsive to the time interval indicated by the historical data failing to differ from the current time interval, leave, by the adaptive data collection apparatus, the current time interval at a current setting.

* * * * *